(12) United States Patent
Schaefer et al.

(10) Patent No.: US 11,663,761 B2
(45) Date of Patent: May 30, 2023

(54) HAND-DRAWN DIAGRAM RECOGNITION USING VISUAL ARROW-RELATION DETECTION

(71) Applicant: SAP SE, Walldorf (DE)

(72) Inventors: Bernhard Schaefer, Heidelberg (DE); Andreas Gerber, Koenigsbach (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 17/411,683

(22) Filed: Aug. 25, 2021

(65) Prior Publication Data

US 2023/0062484 A1    Mar. 2, 2023

(51) Int. Cl.
| | | |
|---|---|---|
| *G06T 11/20* | (2006.01) | |
| *G06T 7/50* | (2017.01) | |
| *G06T 3/40* | (2006.01) | |
| *G06V 10/98* | (2022.01) | |
| *G06V 20/10* | (2022.01) | |
| *G06F 18/24* | (2023.01) | |
| *G06V 30/142* | (2022.01) | |

(52) U.S. Cl.
CPC ............ *G06T 11/206* (2013.01); *G06F 18/24* (2023.01); *G06T 3/4046* (2013.01); *G06T 7/50* (2017.01); *G06V 10/98* (2022.01); *G06V 20/10* (2022.01); *G06V 30/142* (2022.01); *G06T 2207/20084* (2013.01); *G06T 2210/12* (2013.01)

(58) Field of Classification Search
CPC ....... G06T 11/206; G06T 7/50; G06T 3/4046; G06T 2207/20084; G06T 2210/12; G06V 10/98; G06V 30/142; G06V 20/10; G06F 18/24
See application file for complete search history.

(56) References Cited

U.S. PATENT DOCUMENTS

| | | | | |
|---|---|---|---|---|
| 7,240,300 | B2 * | 7/2007 | Jaeger ................. | G06F 3/04883 715/862 |
| 7,397,950 | B2 * | 7/2008 | Shilman ............. | G06V 30/1423 382/179 |
| 10,482,592 | B2 * | 11/2019 | Yamada ................. | G06F 18/22 |
| 10,643,067 | B2 * | 5/2020 | Bednarowicz ........ | G06F 16/353 |
| 10,852,938 | B2 * | 12/2020 | Guiavarc'h ........... | G06F 40/166 |
| 10,956,727 | B1 * | 3/2021 | Schaefer ............... | G06T 11/206 |

(Continued)

OTHER PUBLICATIONS

Altun et al., "SKETRACK: Stroke-Based Recognition of Online Hand-Drawn Sketches of Arrow-Connected Diagrams and Digital Logic Circuit Diagrams" (pp. 1-18). (Year: 2019).*

(Continued)

*Primary Examiner* — Manav Seth
(74) *Attorney, Agent, or Firm* — Buckley, Maschoff & Talwalkar LLC (57) ABSTRACT

Computer-readable media, methods, and systems are disclosed for converting a diagram into a digital diagram format. A diagram is received as an image file and a plurality of recognition stages produce a final diagram based on predicted information from one or more of the recognition stages. The plurality of recognition stages including a shape detection stage for detecting a plurality of shapes and at least one arrow detection stage in which arrows are detected as relations between pairs of shapes. The final diagram is generated based on the predicted information and is converted into the digital diagram format compatible with a diagram modeling language.

20 Claims, 7 Drawing Sheets

(56) References Cited

U.S. PATENT DOCUMENTS

| | | | | |
|---|---|---|---|---|
| 10,976,918 B2* | 4/2021 | MéLinand | ............ | G06V 30/387 |
| 11,157,732 B2* | 10/2021 | Bednarowicz | ........ | G06F 16/353 |
| 2008/0104526 A1* | 5/2008 | Jaeger | .................. | G06F 3/0481 |
| | | | | 715/763 |
| 2014/0285425 A1* | 9/2014 | Takahashi | ........... | G06F 3/04883 |
| | | | | 345/156 |
| 2021/0278965 A1* | 9/2021 | MéLinand | ............. | G06V 30/32 |

OTHER PUBLICATIONS

Schaefer, Bernhard et al.; Arrow R-CNN for Handwritten Diagram Recognition; International on Document Analysis and Recognition (IJDAR); Feb. 2, 2021; p. 1-15; Springer Nature.

Communication: "Extended European Search Report", dated Apr. 29, 2022 (Apr. 29, 2022), European Patent Office, for European Application No. 21/205,525-1207, 10 pages.

Schäfer, Bernhard et al., "Arrow R-CNN for handwritten diagram recognition", International Journal on Document Analysis and recognition (IJDAR), Feb. 2, 2021 (Feb. 2, 2021), vol. 24, No. 1-2, (pp. 3-17, 15 total pages), XP037474798, ISSN: 1433-2833, DOI: 10.1007/s10032-020-00361-1, [retrieved on Feb. 2, 2021].

Schäfer, Bernhard et al., "Sketch2BPMN: Automatic Recognition of Hand-Drawn BPMN Models", Jun. 24, 2021 (Jun. 24, 2021), Computer Vision—ECCV 2020: 16th European Conference, Glasgow, UK, Aug. 23-28, 2020 Proceedings; [Lecture Notes in Computer Science; ISSN: 0302-9743], Springer International Publishing, Cham, (pp. 344-360, 17 total pages), XP047599537, ISBN: 978-3-030-58594-5, [retrieved on Jun. 24, 2021].

\* cited by examiner

HAND-DRAWN DIAGRAM RECOGNITION USING VISUAL ARROW-RELATION DETECTION

BACKGROUND

Diagrams may be used to represent a variety of concepts such as business processes, algorithms, and software architectures, in which the diagrams may include various symbols, lines, and arrows representing concepts and relationships between those concepts. In many cases, such diagrams may be created using hand-drawing techniques where it may become difficult to transition the hand-drawn diagrams into digital modeling formats.

Hand-drawn diagrams may be either manually recreated using a modeling tool or automatically using a diagram recognition technique. Manual recreation of diagrams is tedious and typically requires users to devote a large amount of time remodeling the diagram within a modeling software and thus, introduces potential for user error. Automatic diagram recognition techniques have been used to create digital representations of hand-drawn diagrams. However, current techniques of diagram recognition struggle to properly identify and recreate many diagram features such as arrows within the initial diagram and usually require additional user input to correct errors in the recognition process.

SUMMARY

Embodiments of the disclosure solve the above-mentioned problems by providing systems, methods, and computer-readable media for automatic diagram recognition to convert an initial image of a diagram into a digital format. In some embodiments, one or more arrows are detected within a drawn diagram as a relationship between a pair of detected shapes using visual relationship detection techniques.

A first embodiment is directed to one or more non-transitory computer-readable media storing computer-executable instructions that, when executed by a processor, perform a method for converting a diagram into a digital model, the method comprising receiving image data associated with the diagram, identifying a plurality of shapes within the image data using a computer vision technique, defining a bounding box for each of the plurality of shapes, predicting one or more shape degrees corresponding to a number of arrows from a plurality of arrows within the image data for each of the plurality of shapes using a shape degree prediction neural network, generating a plurality of edge candidates corresponding to the plurality of shapes, predicting a probability that a pair of shapes of the plurality of shapes are connected using an edge prediction neural network, identifying an arrow of the plurality of arrows using the edge prediction neural network, classifying the arrow into an arrow type using the edge prediction neural network, predicting an arrow path for the arrow including a sequence of key points, determining a final diagram based on the predicted probability and predicted shape degrees, and converting the final diagram into a digital diagram format.

A second embodiment is directed to a method for converting a diagram into a digital model, the method comprising receiving image data associated with the diagram, identifying a plurality of shapes within the image data using a computer vision technique, defining a bounding box for each of the plurality of shapes, predicting one or more shape degrees corresponding to a number of arrows from a plurality of arrows within the image data for each of the plurality of shapes using a shape degree prediction neural network, generating a plurality of edge candidates corresponding to the plurality of shapes, predicting a probability that a pair of shapes of the plurality of shapes are connected using an edge prediction neural network, identifying an arrow of the plurality of arrows using the edge prediction neural network, classifying the arrow into an arrow type using the edge prediction neural network, predicting an arrow path for the arrow including a sequence of key points, determining a final diagram based on the predicted probability and predicted shape degrees, and converting the final diagram into a digital diagram format.

A third embodiment is directed to a recognition system comprising a shape detection stage associated with a shape detection neural network, a shape degree prediction stage associated with a shape degree prediction neural network, an edge candidate stage, an edge connection prediction stage associated with an edge connection prediction neural network, an edge optimization stage, and at least one processor programmed to perform a method for converting a diagram into a digital model, the method comprising receiving image data associated with the diagram, identifying a plurality of shapes within the image data using the shape detection neural network at the shape detection stage, defining a bounding box for each of the plurality of shapes, predicting one or more shape degrees corresponding to a number of arrows from a plurality of arrows within the image data for each of the plurality of shapes using the shape degree prediction neural network at the shape degree prediction stage, generating a plurality of edge candidates corresponding to the plurality of shapes at the edge candidate stage, predicting a probability that a pair of shapes of the plurality of shapes are connected using the edge prediction neural network at the edge connection prediction stage, identifying an arrow of the plurality of arrows using the edge prediction neural network, classifying the arrow into an arrow type using the edge prediction neural network, predicting an arrow path for the arrow including a sequence of key points, determining a final diagram based on the predicted probability and predicted shape degrees, and converting the final diagram into a digital diagram format.

Additional embodiments are directed to methods of automatically recognizing symbols, lines, and arrows within a hand-drawn diagram to produce a final diagram in a digital modeling format.

Further embodiments are directed to methods of synthetically increasing a size and effectiveness of a training data set for an artificial neural network by copying images within the training data set and applying various image augmentations to the copied images. In some such embodiments, image augmentations may be applied to simulate natural image variance associated with photography and human error.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the disclosure can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
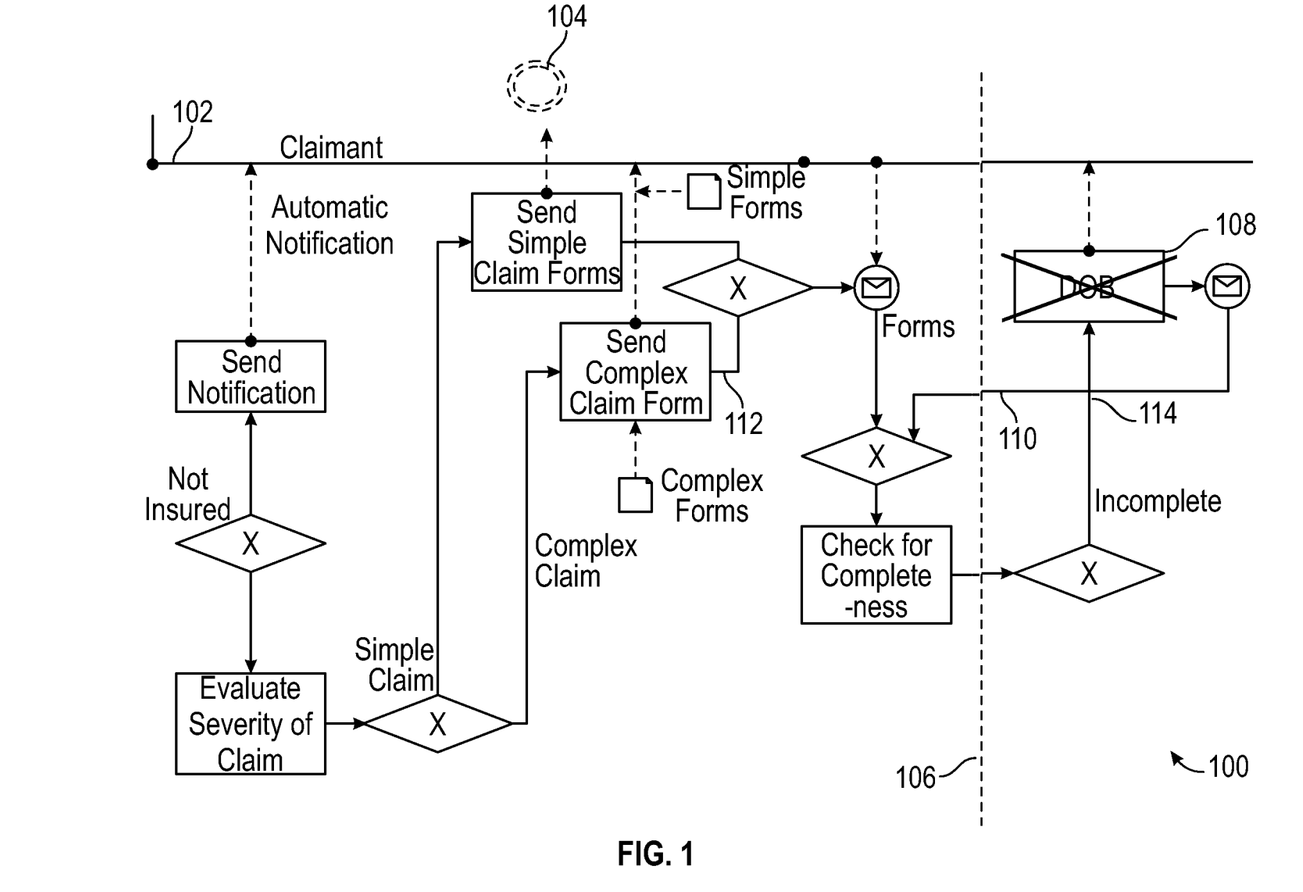
FIG. 1 depicts an exemplary hand-drawn diagram relating to some embodiments.

Turning first to FIG. 1, an exemplary hand-drawn diagram 100 is depicted relating to some embodiments. The hand-drawn diagram 100 may be a diagram or flow chart used to represent a concept or a combination of concepts such as, for example, manufacturing processes, business processes, computer processing techniques, computer hardware architecture, or computer software architecture. In some embodiments, the hand-drawn diagram 100 may be hand-drawn by a user using pen, pencil, marker, or some other drawing medium. Alternatively, in some embodiments, the hand-drawn diagram 100 may be created using a computer assisted drawing technique such as by using a touch screen, virtual whiteboard, or interactive whiteboard. In some embodiments, the hand-drawn diagram 100 includes one or more deficiencies which produce recognition challenges when the hand-drawn diagram 100 is to be converted to a digital diagram format, as will be described below.

In some embodiments, the hand-drawn diagram 100 includes a partially drawn shape 102, as shown. Accordingly, it may become difficult to accurately recognize and identify said shape as a diagram object. In some embodiments, the hand-drawn diagram 100 includes one or more visible bleed-through elements 104 which are unintentionally visible from the back of the paper or other drawing surface. For example, the hand-drawn diagram 100 may be drawn using pen on a sheet of paper which has already been used such that bleed-through elements 104 on the back side of the paper are visible in the hand-drawn diagram 100. Additionally, in some embodiments, the hand-drawn diagram 100 may comprise more than one sheet of paper, as shown, such that an edge 106 between the sheets of paper is visible within the hand-drawn diagram 100.

In some embodiments, one or more crossed-out elements 108 may be included in the hand-drawn diagram 100. For example, if a user uses a pen to create the hand-drawn diagram 100 it may be difficult to remove unintentional marks and mistakes such that the user crosses out said marks. Additionally, in some embodiments, one or more interrupted lines 110 may be included in the hand-drawn diagram 100, as shown. For example, the interrupted lines 110 may be created when joining the two sheets of paper at the edge 106, as shown. Further, in some embodiments, one or more missing arrowheads 112 may be present. For example, the user may forget to include an arrow showing the direction of a process flow within the hand-drawn diagram 100. Further still, in some embodiments, one or more crossing lines 114 may be present where one line crosses another line producing some ambiguity as to the direction of the lines.

In some embodiments, additional deficiencies and challenges may include paper warping, reflections, shadowing, varying line thickness, varying line color, and motion blur. In some embodiments, any combination of the above mentioned deficiencies may be present in the hand-drawn diagram 100. Alternatively, in some embodiments, additional deficiencies not described herein may be present. Further, embodiments are contemplated in which none of the deficiencies are present. In some embodiments, it may be desirable to overcome the above mentioned recognition challenges to generate a digital diagram which is an accurate representation of the initial hand-drawn diagram 100. In some embodiments, machine learning algorithms such as artificial neural networks may be used to overcome the various recognition challenges described herein. Accordingly, the neural networks may be trained to correctly identify various diagram elements regardless of the recognition challenges that might be present in a hand-drawn diagram.

Figure 2:
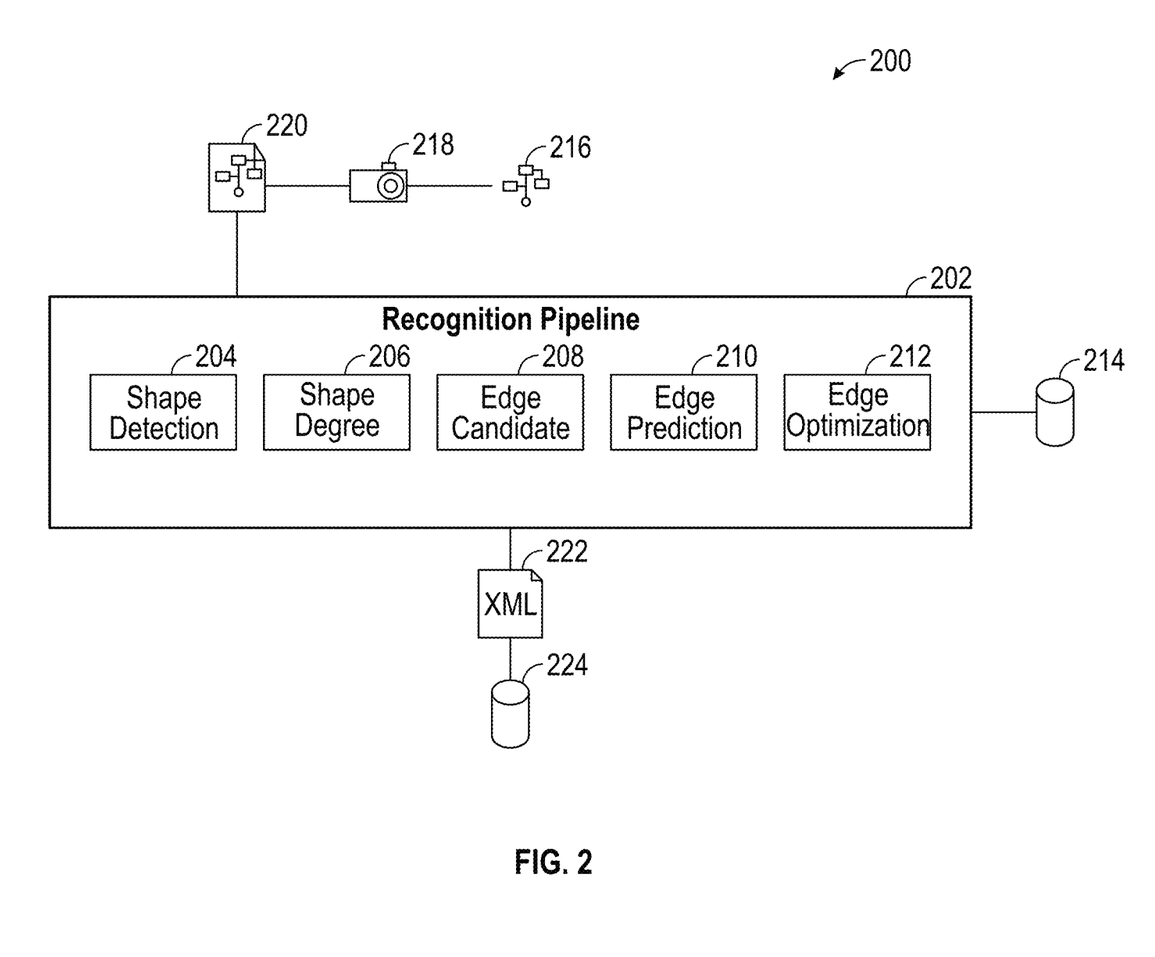
FIG. 2 depicts a recognition system relating to some embodiments.

Turning now to FIG. 2, a recognition system 200 is depicted relating to some embodiments. In such embodiments, a recognition pipeline 202 is included for diagram recognition and conversion. In some embodiments, the recognition pipeline 202 includes a shape detection stage 204, a shape degree prediction stage 206, an edge candidate stage 208, an edge prediction stage 210, and an edge optimization stage 212. In some embodiments, one or more of the shape detection stage 204, the shape degree prediction stage 206, the edge candidate stage 208, the edge prediction stage 210, and the edge optimization stage 212 include a machine learning model. Accordingly, a training data store 214 may be communicatively coupled to the recognition pipeline 202 for supplying training data for the machine learning models. In some embodiments, a plurality of separate training data stores may be included.

In some embodiments, an initial hand-drawn diagram 216 may be captured using an image capture device 218. The image capture device 218 may be a camera such as a digital camera or a camera of a smart phone, or an image scanning device. For example, in some embodiments, the image may be scanned using a scanning device such as a computer scanner or a scanning application on a mobile phone or tablet. Accordingly, an image file 220 may be supplied to the recognition pipeline 202 from the image capture device 218. Alternatively, in some embodiments, the image file 220 may be stored first and then transferred to the recognition pipeline 202. In some embodiments, the image file 220 may be stored as any of a Portable Document Format (PDF), a Portable Network Graphics (PNG), or a Joint Photographic Experts Group (JPEG) image file, as well as any other suitable form of image file type. The recognition pipeline 202 receives the image file 220 and recognizes one or more diagram objects through the various recognition stages, as will be described in further detail below.

After diagram recognition by the recognition pipeline 202, the recognition pipeline 202 produces a digital diagram file 222 based on the received image file 220. In some embodiments, the digital diagram file 222 may be an Extensible Markup Language (XML) file or a file of another digital format. In some embodiments, the digital diagram file 222 may be stored in a data store 224, which may be communicatively coupled to the recognition pipeline 202. In some embodiments, the data store 224 may be communicatively coupled to a user device such that the digital diagram file 222 is accessible to a user. For example, the digital diagram file 222 may be sent to a smart phone of the user which the user used to capture the image file 220 of the initial hand-drawn diagram 216. Further, embodiments are contemplated in which the data store 224 is a local storage on the user device that initially captured the image. Accordingly, in some embodiments, the entirety of the recognition system 200 is included on a user device such as a smart phone, tablet, or personal computer. Alternatively, embodiments are contemplated in which a portion of the components of the recognition system 200 are remote. For example, in some embodiments, the data store 224 and image capture device 218 are part of a user device which communicates with a remote server comprising the recognition pipeline 202. Accordingly, in such an example, the image file 220 may be sent from the user device to the remote server and the digital diagram file 222 is returned from the remote server after execution of the stages of the recognition pipeline 202.

Figure 3:
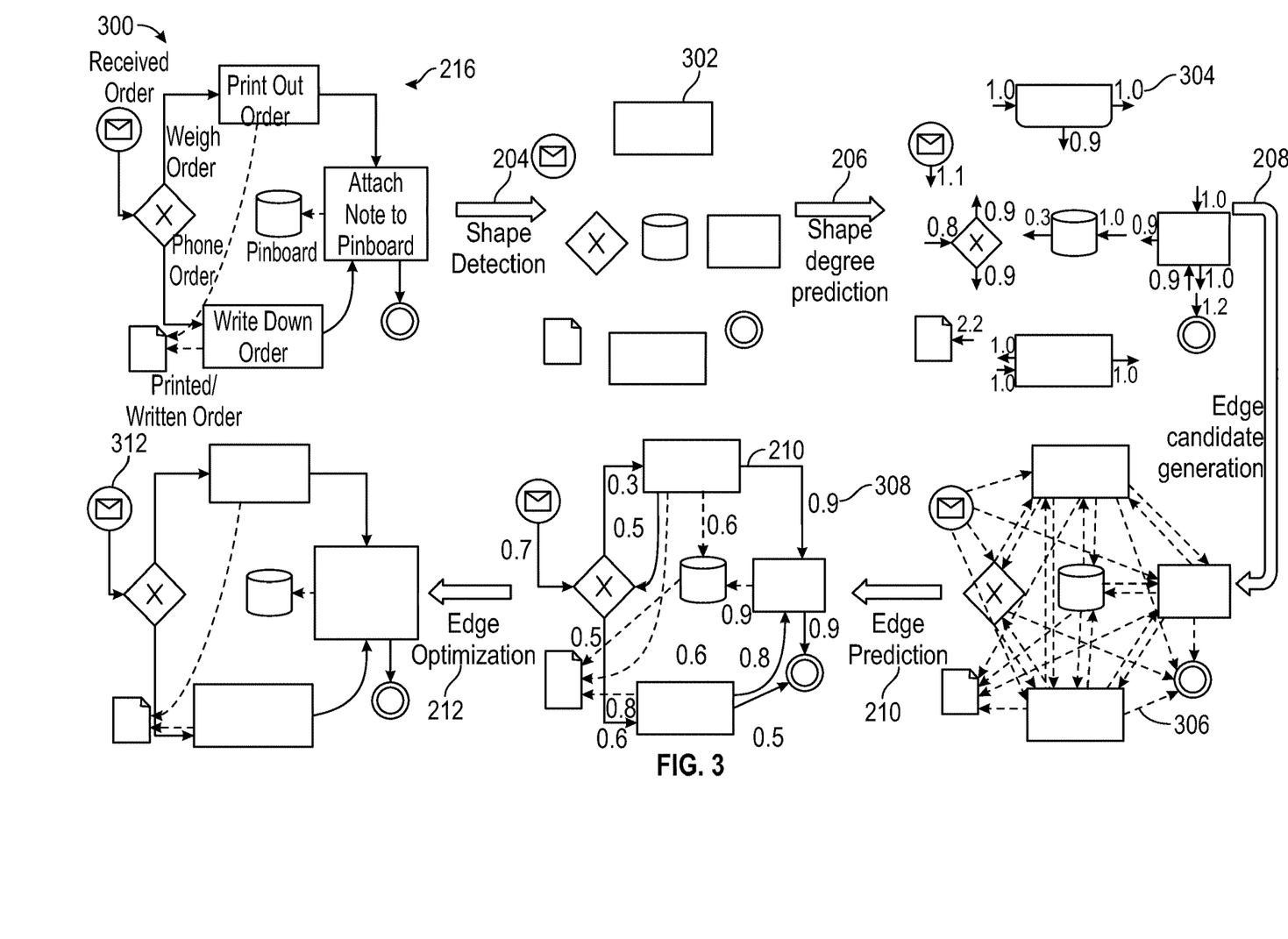
FIG. 3 depicts an exemplary process flow relating to some embodiments.

Turning now to FIG. 3, an exemplary process flow 300 of the operation of the recognition pipeline 202 is depicted relating to some embodiments. In some embodiments, the image file 220 including a representation of the initial hand-drawn diagram 216 is received by the recognition pipeline 202. The shape detection stage 204 identifies and classifies a plurality of shapes within the image file 220. In some embodiments, the shapes are diagram objects which may or may not include text. For example, a shape may be a diagram symbol such as a box or a decision block within the diagram. Further, in some embodiments, the shapes may include a variety of types of diagram objects such as, symbols, lines, or arrows. In some embodiments, the shape detection stage 204 utilizes a shape detection machine learning model which may be a shape detection neural network trained to identify one or more shapes or other diagram objects. In some embodiments, the shape detection neural network may be trained using training data from the training data store 214. In some embodiments, the shape detection stage 204 uses a computer vision technique to identify and classify shapes. Accordingly, a plurality of shapes 302 may be detected and identified at the shape detection stage 204.

In some embodiments, the shape degree prediction stage 206 generates a plurality of degree predictions 304 for each of the plurality of shapes 302. In some embodiments, the degree predictions 304 predict a number of in-going and out-going arrows at given direction for each of the plurality of shapes 302. In some embodiments, degree predictions 304 may be made for each of four directions including up, down, left, and right. In some embodiments, the degree predictions 304 are made using a shape degree neural network trained to predict the number of in-going and out-going arrows of a shape, for example, using training data from the training data store 214.

In some embodiments, the edge candidate stage 208 generates an edge candidate graph 306 including a plurality of edge candidates based at least in part on syntactical rules from a diagram modeling language and the degree predictions 304. In such embodiments, each of the edge candidates is associated with a shape pair including two shapes of the plurality of shapes 302 and indicates a possible connection between the two shapes. In some embodiments, the edge prediction stage 210 predicts a plurality of edge probabilities 308 indicating the probability that a given shape pair is connected by a specific arrow type. In some embodiments, the edge prediction stage 210 further predicts a plurality of arrow paths 310 as a sequence of key points. In some embodiments, the edge prediction stage 210 uses an edge prediction neural network to predict the probability and the arrow path.

In some embodiments, the edge optimization stage 212 determines a final diagram 312 based on the predicted edge probabilities 308 and degree predictions 304. In some embodiments, the edge optimization stage 212 optimizes the final diagram 312 by removing superfluous components such as extra arrows. Here, the edge optimization stage 212 may determine degree penalty terms by comparing edge probabilities 308 and shape degree predictions 304 and removing arrows if the penalty terms sum to a value greater than a predetermined threshold penalty value. Additionally, in some embodiments, the edge optimization stage 212 converts the final diagram 312 into a digital diagram format such as Business Process Modeling Notation (BPMN) XML, or Unified Modeling Language (UML) to produce the digital diagram file 222.

Figure 4:
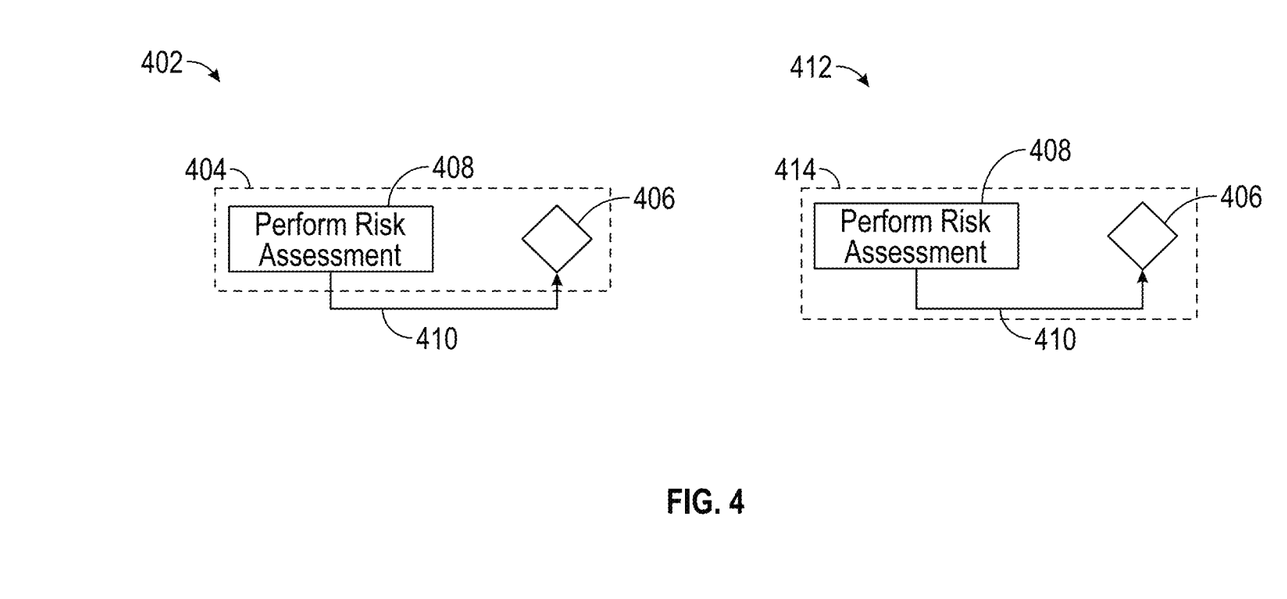
FIG. 4 depicts an exemplary comparison of arrow-relation bounding box generation techniques relating to some embodiments.

Turning now to FIG. 4, an exemplary comparison of arrow-relation bounding box generation techniques is depicted relating to some embodiments. In some embodiments, arrow-relation bounding boxes may be generated at the edge prediction stage 210. In some embodiments, a simple approach 402 may be used to form a union bounding box 404 generated as the smallest possible union of the bounding boxes for a pair of shapes. For example, the union bounding box 404 may be formed as the union of a first shape bounding box of a first shape 406 and a second shape bounding box of a second shape 408, as shown. However, in some cases the simple approach 402 may produce union bounding box 404 which misses parts of the drawn arrow 410 outgoing from either of the first or second shape. Accordingly, in some embodiments, it may be desirable to use a direction-based approach 412, such that the arrows may be captured more closely, as will be described below.

In some embodiments, the direction-based approach 412 may be used to produce a direction-based bounding box 414 based at least in part on the predicted shape degrees. Accordingly, in some embodiments, the union bounding box 404 may be generated initially for the shape pair (408, 406) and then transformed into the direction-based bounding box 414 based on one or more of the predicted in-going and out-going shape degrees. For example, the shape 408 has an outgoing arrow 410 in a bottom direction. Given the predicted out-going shape degree in the bottom direction for shape 408, the initial union bounding box 404 of the shape pair may be transformed by padding the bounding box on the bottom side and generate the direction-based bounding box 414. The direction-based bounding box 414 is more likely to contain the entire arrow 410. In some embodiments, the initial union bounding box 404 may be padded by a predetermined pixel value. For example, in one embodiment, the union bounding box 404 is padded by a fraction of the height of the shape bounding box. Further still, in some embodiments, the amount of padding may be determined relative to the size of the entire hand-drawn diagram.

Figure 5A:
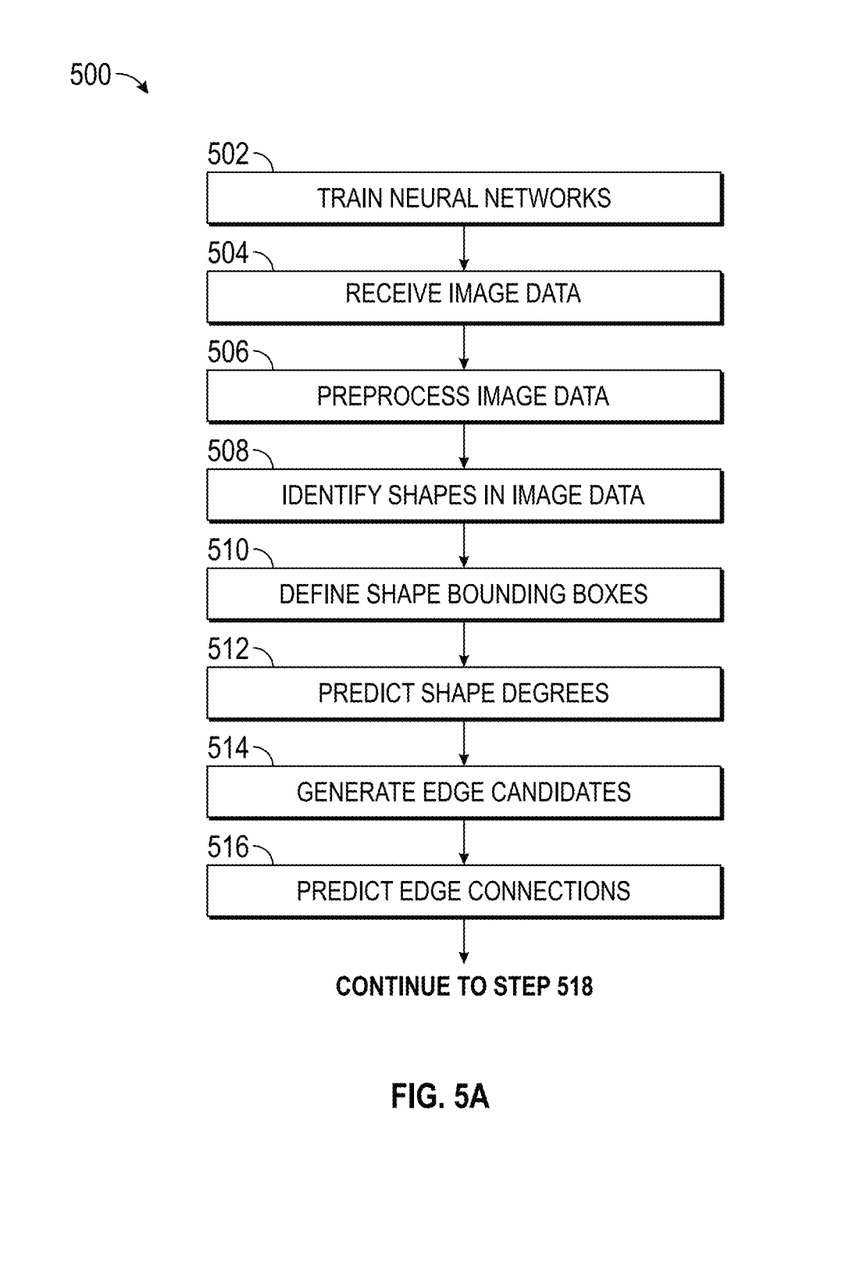
FIGS. 5A-5B depict an exemplary method for converting a diagram into a digital model relating to some embodiments.

Turning now to FIG. 5A, an exemplary method 500 for converting a diagram into a digital model is depicted relating to some embodiments. In some embodiments, one or more of the steps described with respect to method 400 may be performed using a processor associated with the recognition system 200. For example, in some embodiments, at least a portion of the steps of method 400 may be performed using the recognition pipeline 202. Further, embodiments are contemplated where a first portion of the steps described herein are performed using the recognition pipeline 202 while a second portion of the steps are performed using a user device or a processor on a server or other computer.

At step 502 one or more neural networks of the recognition pipeline 202 are trained using a set of training data from the training data store 214. In some embodiments, the neural networks include any combination of a shape detection neural network, a degree prediction neural network, an edge candidate neural network, an edge prediction neural network, and an edge optimization procedure. Further, in some such embodiments, one or more of the neural networks may be a deep convolutional neural network including convolution kernels. In some embodiments, the set of training data includes a plurality of image data. In some embodiments, it may be desirable to increase the size of the set of training data using image augmentation to randomly change the image data, for example, by adjusting image parameters such as saturation, value, and contrast. Accordingly, a given image may be duplicated and adjusted to increase the number of images in the set of training data. In some embodiments, the image augmentation may be simulate image effects from natural photography to create a more robust network of training data. Additionally, in some embodiments, the image data may be augmented by adding one or more additional text images and shapes into the training image diagrams. Further, the image data may be augmented by shifting the image, scaling the image, rotating the image, and flipping the image, any of which may be applied in randomly varying magnitudes. For example, a random number generation algorithm may be used to determine a random value between 0 and 360 which is used as the degree value to rotate the image.

In some embodiments, the image augmentation of the training data may be applied to additionally or alternatively improve the accuracy of the artificial neural network components of the recognition pipeline 202. For example, random text images including words may be randomly added into the training data to improve the training of the neural networks in distinguishing between text and arrows. In one example, a handwritten letter "I" may be confused with an arrow. Accordingly, it may be desirable to insert text including the letter "I" into the training images such that the neural network is trained to more accurately make the distinction between the letter "I" and diagram arrows. Further, in some embodiments, the training data may be augmented using elastic distortion augmentation to simulate natural uncontrolled oscillations of hand muscles while a person is drawing a diagram. Here, random distortions may be applied to objects and lines within the training data images such that the neural network is adapted to diagram features which arise from natural oscillations of hand muscles in a hand-drawn diagram.

At step 504 image data is received into the recognition pipeline 202. In some embodiments, the image data may be received by a user uploading or sending a captured image from a smart phone or some other mobile device. Additionally, in some embodiments, the image data may comprise a scanned image from a scanning device. Further, embodiments are contemplated where the image data may be stored on a user device such as a mobile phone or computer of the user and the recognition pipeline 202 is executed on the user device such that the image data does not need to be uploaded or sent an may be accessed directly. In some embodiments, the received image data comprises one or more image files such as image file 220 corresponding to the hand-drawn diagram 216. At step 506 one or more pre-processing operations may be performed on the received image data. In some embodiments, pre-processing includes resizing an image file to a fixed size by scaling the image such that the longest side of the image matches a fixed pixel value. For example, in some embodiments, it may be desirable to scale the image until the longest side is 1333 pixels long. Accordingly, the aspect ratio of the image may be maintained such that the both the length and height of the image are scaled by equal amounts.

At step 508 one or more shapes are identified within the image data using the shape detection stage 204. In some embodiments, the shape detection stage 204 may employ various computer vision techniques to identify and classify shapes from the image data. In some embodiments, the one or more shapes are detected as one or more object nodes. In some embodiments, a probability may be determined for each shape. For example, the probability may be determined corresponding to the likelihood that a given shape of a given classification is included. In some embodiments, this probability may be determined by comparing the drawn shape from the initial hand drawn diagram to an expected symbol within the modeling language. Accordingly, for example, a drawn shape that exactly matches an expected symbol would receive a probability of 1.0 or 100%. In some embodiments, only shapes with a probability that exceeds a minimum threshold are used. For example, only shapes with a probability of 0.7 (70%) or greater are kept in the diagram.

In some embodiments, the shape detection stage 204 determines one or more regions of interest within the image data. In such embodiments, each region of interest indicates potential objects within the diagram such as symbols, lines, and arrows. However, in some such embodiments, the region of interest does not classify the objects. Instead, the objects may be classified after identifying one or more regions of interest within the diagram. Further, in some embodiments, the regions of interest may be updated based on later determinations and classifications in the process. In some embodiments, the shape detection stage 204 assigns an object score to each identified region of interest. The object score may indicate the probability that the region of interest contains a diagram object such as a symbol, line, or arrow.

In some embodiments, the shape detection stage 204 may classify shapes according to a specific set of modeling rules for an intended modeling format. For example, if a BPMN modeling format is intended for the final diagram then shapes may be classified into a corresponding BPMN classification. Accordingly, for example, an identified shape including a circle with a letter icon may be classified as a BPMN message event diagram object. In some embodiments, a variety of different diagram object classifications are contemplated. For example, the classifications may include any of activity objects such as a task object and a subprocess object, event objects such as an untyped object, a message object, and a timer object, gateway objects such as an exclusive gateway object, a parallel gateway object, and an event-based gateway object, and data element objects such as a data object and a data store object.

At step 510 a shape bounding box is defined for each of the identified shapes. In some embodiments, the shape bounding box may be defined based on the determined classification for the shape. In some embodiments, the shape bounding box may be defined by determining a set of corner points representing the outer-most edges of the shape. Additionally, in some embodiments, the shape bounding boxes may be padded such that the entire shape fits within the bounding box. For example, in some embodiments, bounding boxes may be padded and stretched to include outgoing arrows associated with the shape. In some embodiments, union bounding boxes and/or direction-based union bounding boxes may be defined, as shown in FIG. 4.

In some embodiments, it may be desirable to identify and remove one or more duplicate and/or overlapping bounding boxes. For example, if a shape has duplicate edges multiple duplicate bounding boxes may be defined for each shape. Accordingly, it may be desirable to identify duplicate bounding boxes for example, by testing if the bounding boxes are overlapping or if one bounding box is concentric to another. In some embodiments, the largest of the duplicate bounding boxes may be kept and the smaller duplicates may be removed. In some embodiments, the object scores of each bounding box may be compared and the bounding box with a higher object score may be kept as it is determined to be more likely to contain a diagram object.

At step 512 one or more shape degrees are predicted for each of the identified shapes. In some embodiments, the predicted shape degrees include one or more out-degrees and one or more in-degrees for the shape at a given direction. Here, the shape degree prediction stage 206 may be predicted corresponding to the predicted number of in and outgoing arrows for each edge of the shape including the top, bottom, left, and right edges. For example, an ingoing shape degree of 2.2 may predict that there are about two ingoing arrows for a given shape at a given edge. In some embodiments, a binary mask associated with the shape bounding box may be concatenated and used as an input for the shape degree prediction stage 206. In some embodiments, a sum may be calculated for each of the in-going and out-going shape degree predictions in all directions to estimate the total number of in-going and out-going arrows.

In some embodiments, regression analysis may be used to generate a degree prediction network that predicts the degrees for each shape based on visual features in the initial hand-drawing such as drawn arrows within the shape bounding box. In some cases, it may be difficult to identify drawn arrows. For example, in some cases, there is a distance between the drawn arrow and the intended target object or shape. Accordingly, in some embodiments, it may be desirable to pad each shape bounding box with a predetermined number of pixels. For example, in some embodiments, the shape bounding boxes may be padded with 50 pixels in each direction. Accordingly, even drawn arrows that are not connected to the shape may be recognized and the shape degree prediction becomes more accurate.

At step 514 edge candidates are generated for the shapes using the edge candidate stage 208. In some embodiments, the number of edge candidates corresponds to the total number of arrows from the predicted shape degrees for all shapes. In some embodiments, the edge candidates may be generated based at least in part on one or more rules of the modeling language. For example, in some embodiments, the modeling language includes syntactical rules governing how shape elements and other objects can be combined. Further, in some embodiments, only a portion of the syntactical rules may be considered to generate edge candidates. In one example, a modeling software may include a syntactical rule that gateway objects should not connect with data element objects. Accordingly, edge candidates between gateway objects and data element objects may be removed. Further still, in some embodiments, edge candidates may be removed based on the shape degrees predicted at step 512. For example, edge candidates may be pruned (e.g., removed) if the degree is less than a predetermined threshold value. In some embodiments, a predetermined threshold of 0.05 may be used such that edge candidates corresponding to a shape degree prediction of less than 0.05 are automatically removed. In some embodiments, it may be desirable to remove some of the edge candidates to optimize the processing of the recognition system 200 such that processing power is not wasted on determining non-useful edge candidates.

At step 516 edge connections are predicted using the edge prediction stage 210. In some embodiments, the edge connections may be predicted as a probability that a given shape pair is connected by a specific arrow type. In some embodiments, the edge prediction stage 210 classifies the edge candidates generated at step 514 based on the original hand-drawn image and the predicted shape degrees from step 512.

Figure 5B:
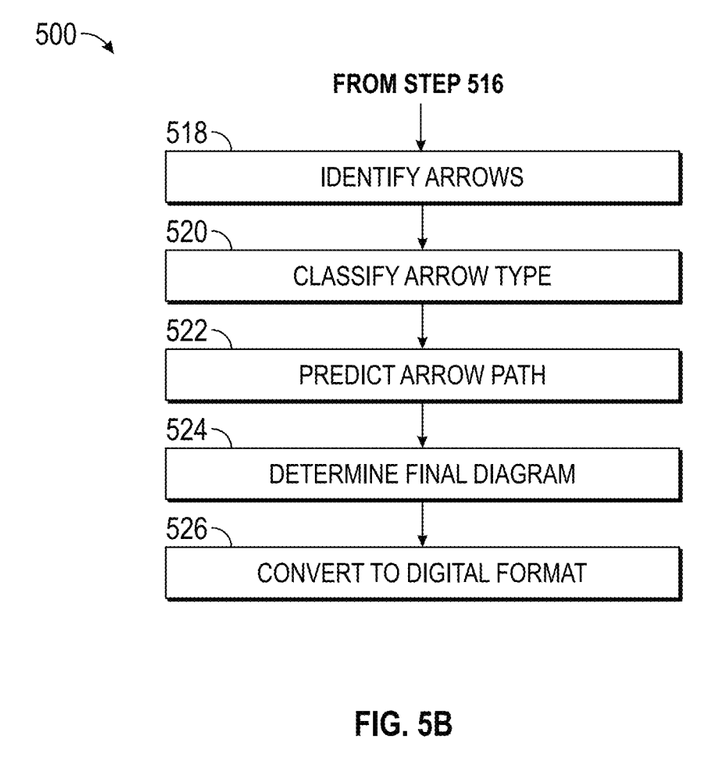

Turning now to FIG. 5B, the method 500 continues to step 518. At step 518 arrows are identified using the edge prediction stage 210 based on one or more of the initial hand-drawn image, the predicted shape degrees, and the edge candidates. In some embodiments, an arrow bounding box is defined for each identified arrow indicating a relevant arrow region for a given shape pair. At step 520 the arrow type is classified using the edge prediction stage 210. In some embodiments, the classification of the arrow may be determined based on one or more visual features of the arrow. Further, in some embodiments, the arrow may be classified based on a context associated with the modeling language. For example, in some embodiments, a specific arrow type may be expected for a given pair of shape types. At step 522 an arrow path is predicted using key points within the diagram. In some embodiments, the arrow path is predicted as a sequence of equidistant points by analyzing the initial hand-drawn diagram 216. In some embodiments, it may be difficult to identify arrow paths including dotted lines. Accordingly, by relating the dotted lines to a sequence of equidistant points in the initial hand-drawn diagram arrow paths can be predicted for difficult arrows with dotted lines.

At step 524 a final diagram is determined using the edge optimization stage 212. In some embodiments, the final diagram is determined by comparing the predicted edge connections and the predicted shape degrees. In some such embodiments, a set of penalty terms is determined by comparing the predicted in-going and out-going shape degrees at a given edge of a shape with the predicted edge connections for that edge. The penalty terms may then be summed and compared to a predetermined threshold penalty value, where if the sum of penalty terms exceeds the threshold value one or more of the predicted edge connections may be removed.

At step 526 the final diagram is converted into a digital diagram modeling format corresponding to a given modeling language. In some embodiments, the digital diagram modeling format is compatible with the diagram modeling language such that the final diagram is accessible within a modeling software. For example, in some embodiments, the final diagram may be converted into a BPMN format and stored as an XML file. In some embodiments, converting the final diagram into a digital modeling format allows users to edit and copy features from the diagram using a modeling tool such as a diagram modeling software. Accordingly, in some embodiments, users may be able to edit aspects of the final diagram after the final diagram is generated. In some embodiments, the recognition system 200 may monitor changes made by users to improve the training of the machine learning components. For example, if a classification is deemed to be incorrect based on a user fixing the classification, then the neural networks may be updated to reflect the change such that the neural network is improved for subsequent use.

In some embodiments, the recognition process may be executed in a short amount of time. For example, embodiments are contemplated in which the method 500 may be performed in under 100 milliseconds. Accordingly, the method 500 may be used to generate a digitally formatted diagram from a hand-drawn diagram in environments where a quick response time is desired.

In some embodiments, a text recognition process may be used to recognize text within the diagram. Embodiments are contemplated in which text is recognized within the final diagram after the final diagram is produced. Alternatively, in some embodiments, text may be recognized before-hand or simultaneously as the diagram recognition stages are being executed. Further, in some embodiments, text may be identified and removed, for example, during the shape detection stage 204 and then added back into the final diagram after the text has been recognized and converted to a digital text format.

Figure 6:
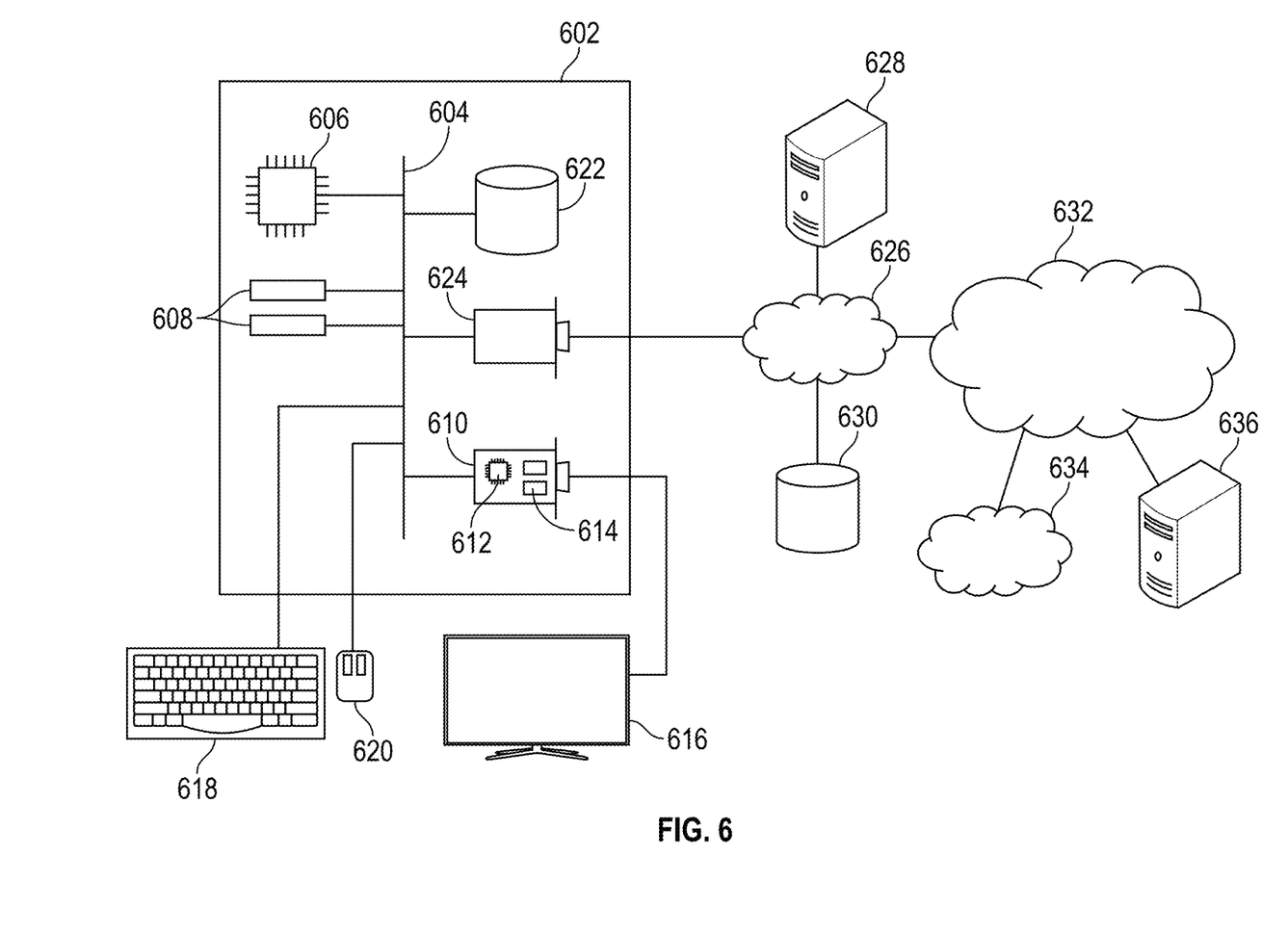
FIG. 6 depicts an exemplary hardware platform relating to some embodiments.

Turning now to FIG. 6, an exemplary hardware platform for certain embodiments is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608, which may store, inter alia, computer-executable instructions in a non-transitory form. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although the present teachings have been described with reference to the embodiments illustrated in the attached drawing figures, it is noted that equivalents may be employed and substitutions made herein without departing from the scope of the disclosure as recited in the claims.

Having thus described various embodiments of the disclosure, what is claimed as new and desired to be protected by Letters Patent includes the following:

The invention claimed is:

1. One or more non-transitory computer-readable media storing computer-executable instructions that, when executed by a processor, perform a method for converting a diagram into a digital model, the method comprising:
receiving image data associated with the diagram;
identifying a plurality of shapes within the image data using a computer vision technique,
defining a bounding box for each of the plurality of shapes;
predicting one or more shape degrees corresponding to a number of arrows from a plurality of arrows within the image data for each of the plurality of shapes using a shape degree prediction neural network;
generating a plurality of edge candidates corresponding to the plurality of shapes;
predicting a probability that a pair of shapes of the plurality of shapes are connected using an edge prediction neural network;
identifying an arrow of the plurality of arrows using the edge prediction neural network;
classifying the arrow into an arrow type using the edge prediction neural network;
predicting an arrow path for the arrow including a sequence of key points;
determining a final diagram based on the predicted probability and predicted shape degrees; and
converting the final diagram into a digital diagram format.

2. The media of claim 1, wherein the image data is associated with a hand-drawn diagram received from a user.

3. The media of claim 2, wherein the image data is produced by scanning the hand-drawn diagram using a scanning device.

4. The media of claim 2,
wherein the image data is produced by photographing a hand-drawn diagram using a camera on a mobile phone, and
wherein the processor is a processor of the mobile phone.

5. The media of claim 1, further comprising:
pre-processing the image data to produce an image with a fixed size.

6. The media of claim 1, further comprising:
defining a union bounding box between two or more shapes of the plurality of shapes based on the respective bounding box for each of the two or more shapes and the predicted arrow path.

7. The media of claim 1, further comprising:
defining one or more degree penalty terms for each shape of the plurality of shapes by comparing the predicted probability and the predicted shape degrees;
summing the one or more penalty terms for each respective shape;
determining whether the sum of the penalty terms exceeds a predetermined threshold value; and
if the sum of the penalty terms exceeds the predetermined threshold value, removing one or more arrows associated with the one or more penalty terms.

8. A method for converting a diagram into a digital model, the method comprising:
receiving image data associated with the diagram;
identifying a plurality of shapes within the image data using a computer vision technique,
defining a bounding box for each of the plurality of shapes;
predicting one or more shape degrees corresponding to a number of arrows from a plurality of arrows within the image data for each of the plurality of shapes using a shape degree prediction neural network;
generating a plurality of edge candidates corresponding to the plurality of shapes;
predicting a probability that a pair of shapes of the plurality of shapes are connected using an edge prediction neural network;
identifying an arrow of the plurality of arrows using the edge prediction neural network;
classifying the arrow into an arrow type using the edge prediction neural network;
predicting an arrow path for the arrow including a sequence of key points;
determining a final diagram based on the predicted probability and predicted shape degrees; and
converting the final diagram into a digital diagram format.

9. The method of claim 8, wherein the digital diagram format of the final diagram is compatible with a diagram modeling language.

10. The method of claim 9, wherein the digital diagram format is an XML format and the diagram modeling language is BPMN.

11. The method of claim 8, further comprising:
pre-processing the image data to produce an image with a fixed size such that a longest side of the image is scaled to a value of 1333 pixels.

12. The method of claim 11, wherein the bounding box for each of the plurality of shapes is padded with 50 pixels added to each side of the image.

13. The method of claim 8, further comprising:
defining one or more degree penalty terms for each shape of the plurality of shapes by comparing the predicted probability and the predicted shape degrees;
summing the one or more penalty terms for each respective shape;
determining whether the sum of the penalty terms exceeds a predetermined threshold value; and
if the sum of the penalty terms exceeds the predetermined threshold value, removing one or more arrows associated with the one or more penalty terms.

14. The method of claim 8, further comprising classifying each shape of the plurality of shapes based on one or more predetermined syntactical rules of a diagram modeling language, wherein the digital diagram format is compatible with the diagram modeling language.

15. A recognition system comprising:
a shape detection stage associated with a shape detection neural network;
a shape degree prediction stage associated with a shape degree prediction neural network;
an edge candidate stage;
an edge connection prediction stage associated with an edge connection prediction neural network;
an edge optimization stage; and
at least one processor programmed to perform a method for converting a diagram into a digital model, the method comprising:
receiving image data associated with the diagram;
identifying a plurality of shapes within the image data using the shape detection neural network at the shape detection stage,
defining a bounding box for each of the plurality of shapes;
predicting one or more shape degrees corresponding to a number of arrows from a plurality of arrows within the image data for each of the plurality of shapes using the shape degree prediction neural network at the shape degree prediction stage;

generating a plurality of edge candidates corresponding to the plurality of shapes at the edge candidate stage;

predicting a probability that a pair of shapes of the plurality of shapes are connected using the edge prediction neural network at the edge connection prediction stage;

identifying an arrow of the plurality of arrows using the edge prediction neural network;

classifying the arrow into an arrow type using the edge prediction neural network;

predicting an arrow path for the arrow including a sequence of key points;

determining a final diagram based on the predicted probability and predicted shape degrees; and converting the final diagram into a digital diagram format.

16. The system of claim 15, further comprising a training data store storing training data including training image data, wherein one or more of the shape detection neural network, the shape degree prediction neural network, and the edge connection prediction neural network are trained using training data from the training data store.

17. The system of claim 16, wherein the training image data of the training data store includes simulated training image data generated using an image augmentation technique to increase an amount of the training data.

18. The system of claim 17, wherein the image augmentation technique includes one or more of: adjusting saturation, adjusting value, and adjusting contrast.

19. The system of claim 15, wherein the method further comprises removing at least one overlapping duplicate bounding box.

20. The system of claim 15, wherein the bounding box for each of the plurality of shapes is padded by a predetermined amount to identify one or more arrows which connect to the shape.

* * * * *